(12) United States Patent
Nishikawa

(10) Patent No.: US 10,556,394 B2
(45) Date of Patent: Feb. 11, 2020

(54) APPARATUS AND METHOD FOR MANUFACTURING RUBBER MEMBER

(71) Applicant: Toyo Tire & Rubber Co., Ltd., Itami-shi, Hyogo (JP)

(72) Inventor: Syuuichi Nishikawa, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 64 days.

(21) Appl. No.: 15/992,709

(22) Filed: May 30, 2018

(65) Prior Publication Data

US 2018/0272640 A1 Sep. 27, 2018

Related U.S. Application Data

(62) Division of application No. 14/834,664, filed on Aug. 25, 2015, now Pat. No. 10,011,083.

(30) Foreign Application Priority Data

Aug. 26, 2014 (JP) .................................. 2014-171834

(51) Int. Cl.
*B29D 30/06* (2006.01)
*B29C 48/00* (2019.01)
(Continued)

(52) U.S. Cl.
CPC ...... *B29D 30/0681* (2013.01); *B29C 48/0021* (2019.02); *B29C 48/131* (2019.02);
(Continued)

(58) Field of Classification Search
CPC ............ B29D 30/0681; B29C 48/0021; B29C 48/131; B29C 48/07; B29C 48/022;
(Continued)

(56) References Cited

U.S. PATENT DOCUMENTS 3,956,056 A 5/1976 Boguslawski et al.
4,012,188 A * 3/1977 Lemelson ............... B29C 53/24
425/373
(Continued)

FOREIGN PATENT DOCUMENTS

JP 2011-235525 A 11/2011
JP 2013-107370 A 6/2013

OTHER PUBLICATIONS

Non Final Office Action dated Nov. 6, 2017, issued in U.S. Appl. No. 14/834,664.
(Continued)

*Primary Examiner* — Jeffrey M Wollschlager
(74) *Attorney, Agent, or Firm* — Westerman, Hattori, Daniels & Adrian, LLP

(57) ABSTRACT

An apparatus of manufacturing a rubber member includes an extruder; a mouthpiece; and a support surface which faces the mouthpiece in an opposed manner. The support surface and the mouthpiece are moved relative to each other thus molding a rubber member on the support surface. The apparatus further includes: a rubber pool portion formed between the mouthpiece and the support surface; and a closing surface having an inclined surface shape and capable of closing a moving-direction front side of the rubber pool portion. A rubber material is ejected from an ejection port in a state where the rubber pool portion is closed by the closing surface, the support surface and the mouthpiece are moved relative to each other after the rubber pool portion is filled with the rubber material, and a lamination starting end of the rubber material is pressed to the closing surface thus molding the lamination starting end into an inclined surface and, thereafter, the closing surface is moved in a direction away from the support surface.

4 Claims, 7 Drawing Sheets

(51) Int. Cl.
    *B29C 48/03*     (2019.01)
    *B29K 21/00*     (2006.01)
    *B29L 7/00*     (2006.01)
    *B29L 30/00*     (2006.01)
    *B29K 9/00*     (2006.01)
    *B29K 7/00*     (2006.01)
    *B29C 48/07*     (2019.01)
    *B29C 48/30*     (2019.01)
    *B29C 48/31*     (2019.01)
    *B29C 48/35*     (2019.01)
    *B29C 48/255*     (2019.01)
    *B29C 48/25*     (2019.01)

(52) U.S. Cl.
    CPC ............ *B29C 48/022* (2019.02); *B29C 48/07* (2019.02); *B29C 48/255* (2019.02); *B29C 48/2556* (2019.02); *B29C 48/266* (2019.02); *B29C 48/30* (2019.02); *B29C 48/301* (2019.02); *B29C 48/302* (2019.02); *B29C 48/31* (2019.02); *B29C 48/35* (2019.02); *B29K 2007/00* (2013.01); *B29K 2009/00* (2013.01); *B29K 2021/00* (2013.01); *B29L 2007/00* (2013.01); *B29L 2030/00* (2013.01)

(58) Field of Classification Search
    CPC ......... B29C 48/30; B29C 48/31; B29C 48/35; B29C 48/255; B29C 48/266; B29C 48/301; B29C 48/302; B29C 48/2556; B29K 2009/00; B29K 2007/00; B29K 2021/00; B29L 2007/00; B29L 2030/00
See application file for complete search history.

(56) References Cited

U.S. PATENT DOCUMENTS

| | | | |
|---|---|---|---|
| 4,299,789 A | | 11/1981 | Giesbrecht |
| 5,171,394 A | * | 12/1992 | Laurent .................. B29D 30/60 |
| | | | 156/397 |
| 5,458,727 A | | 10/1995 | Meyer |
| 5,928,679 A | | 7/1999 | Ohki et al. |
| 6,264,780 B1 | * | 7/2001 | Iwanaga ................ B29D 30/48 |
| | | | 156/136 |
| 6,821,106 B1 | | 11/2004 | Looman, Jr. et al. |
| 8,282,378 B2 | | 10/2012 | Ougier et al. |
| 8,523,551 B2 | * | 9/2013 | Ashimoto .............. B29D 30/72 |
| | | | 425/131.1 |
| 8,956,559 B2 | * | 2/2015 | Kimura .................... B29C 48/30 |
| | | | 264/209.2 |
| 9,855,714 B2 | * | 1/2018 | Nishikawa .......... B29D 30/1628 |
| 9,919,466 B2 | * | 3/2018 | Kitagawa ................ B29C 48/08 |
| 2005/0116374 A1 | * | 6/2005 | Ogawa ..................... B29C 66/71 |
| | | | 264/103 |
| 2005/0183810 A1 | | 8/2005 | Abe et al. |
| 2005/0230031 A1 | | 10/2005 | Nicolas |
| 2008/0251185 A1 | | 10/2008 | Cappa et al. |
| 2013/0134631 A1 | | 5/2013 | Kitagawa et al. |
| 2015/0068667 A1 | * | 3/2015 | Nishikawa .............. B29C 48/07 |
| | | | 156/117 |

OTHER PUBLICATIONS

Notice of Allowance dated Mar. 27, 2018, issued in U.S. Appl. No. 14/834,664 (8 pages).

* cited by examiner

APPARATUS AND METHOD FOR MANUFACTURING RUBBER MEMBER

CROSS-REFERENCE TO RELATED APPLICATIONS

This application is a Divisional of U.S. patent application Ser. No. 14/834,664, filed on Aug. 25, 2015, which is based upon and claims the benefit of priority of the prior Japanese Patent Application No. 2014-171834, filed on Aug. 26, 2014, the entire contents of which are incorporated herein by reference.

BACKGROUND

1. Technical Field

The present invention relates to an apparatus and a method of manufacturing a rubber member.

2. Related Art

In general, a pneumatic tire is manufactured in such a manner that respective tire constituting members such as an inner liner, side wall portions, bead portions and a tread portion are formed in advance, a green tire is formed by laminating these tire constituting members in an unvulcanized state, and the green tire is molded by vulcanization. There may be a case where these tire constituting members are molded such that a mixed and kneaded rubber material is extruded from a mouthpiece by an extruder thus forming a rubber member having a predetermined cross-sectional shape, and end portions of the formed rubber member are bonded to each other.

In the case where the tire constitutional member is formed by joining the end portions of the rubber member in this manner, when a cross-sectional shape of the rubber member molded by extrusion is fixed, a joining portion has a large thickness compared to other portions thus giving rise to a drawback that a weight balance becomes non-uniform.

In view of such a drawback, JP-A-2013-107370 proposes an apparatus having the constitution where a rubber member is molded by extruding a rubber material to a support surface from a mouthpiece of an extruder and by rotatably moving the support surface and the mouthpiece relative to each other, wherein a rubber pool portion is formed between the support surface and the mouthpiece, an opening portion of the rubber pool portion is closed by a shutter, a rubber material ejected from the mouthpiece is filled in the rubber pool portion and, thereafter, an opening portion is opened by moving the shutter while moving the support surface and the mouthpiece relative to each other. With such a configuration, a thickness of a terminal end portion of the molded rubber member can be reduced and hence, it is possible to prevent the joining portion from having a large thickness compared to other portions.

However, the following is found with respect to the structure shown in FIG. 10, which is disclosed in JP-A-2013-107370. That is, a rubber material filled in the rubber pool portion 106 formed between the support surface 102 and the mouthpiece 104 intrudes into a slight clearance formed between the support surface 102 and the shutter 108 thus forming a rubber film portion m0 having a small thickness at a starting end ms of the rubber member m as shown in FIG. 11. However, there may be a case where a thickness of the rubber film portion m0 is sharply increased thus forming the starting end ms having a large change in film thickness due to the movement of the shutter 108 toward an open position. Although a gentle change in thickness may be acquired by reducing a moving speed of the shutter 108, it is not always easy to control a change in thickness based on a moving speed.

SUMMARY

The invention has been made in view of the above-mentioned circumstances, and it is an object of the invention to provide an apparatus for manufacturing a rubber member and a method for manufacturing a rubber member which can enhance uniformity of a weight balance by forming a lamination starting end of a rubber member into an inclined surface with respect to a support surface.

According to an aspect of the invention, there is provided an apparatus for manufacturing a rubber member which includes: an extruder which kneads a rubber material and extrudes a kneaded rubber material; a mouthpiece which ejects the rubber material supplied from the extruder; and a support surface which faces the mouthpiece in an opposed manner, the support surface and the mouthpiece being moved relative to each other thus molding a rubber member made of the rubber material on the support surface, wherein the apparatus further includes: a rubber pool portion which is formed between the mouthpiece and the support surface and in which the rubber material ejected from an ejection port of the mouthpiece is pooled; and a closing surface which is capable of closing the rubber pool portion on a front side in a moving direction of the support surface with respect to the mouthpiece, the closing surface being inclined so as to narrow a distance between the closing surface and the support surface toward the front side in the moving direction, and wherein the rubber material is ejected from the ejection port in a state where the rubber pool portion is closed by the closing surface, the support surface and the mouthpiece are moved relative to each other after at least a portion of the rubber pool portion is filled with the rubber material, and a lamination starting end of the rubber material to the support surface is pressed to the closing surface thus molding the lamination starting end into an inclined surface shape and, thereafter, the closing surface is moved in a direction away from the support surface.

According to another aspect of the invention, there is provided a method for manufacturing a rubber member where a rubber material fed out from an extruder is ejected from a mouthpiece, and a support surface which faces the mouthpiece in an opposed manner and the mouthpiece are moved relative to each other while ejecting the rubber material from the mouthpiece thus molding a rubber member made of the rubber material on the support surface, wherein the method includes: forming a rubber pool portion between the mouthpiece and the support surface; closing the rubber pool portion by a closing surface which is inclined so as to narrow a distance between the closing surface and the support surface toward a front side in a moving direction of the support surface with respect to the mouthpiece on the front side in the moving direction; ejecting the rubber material into the rubber pool portion from an ejection port of the mouthpiece in a state where the rubber pool portion is closed by the closing surface; moving the support surface and the mouthpiece relative to each other after at least a portion of the rubber pool portion is filled with the rubber material; and molding a lamination starting end of the rubber material to the support surface into an inclined surface shape by pressing the lamination starting end to the closing surface, and thereafter, moving the closing surface in a direction away from the support surface.

According to the invention, the starting end of the rubber member can be formed into an inclined surface shape and hence, for example, even when the end portions are joined to each other, a joining portion does not have a large thickness compared to other portions whereby uniformity of weight balance can be enhanced.

DETAILED DESCRIPTION

First Embodiment

Figure 1:
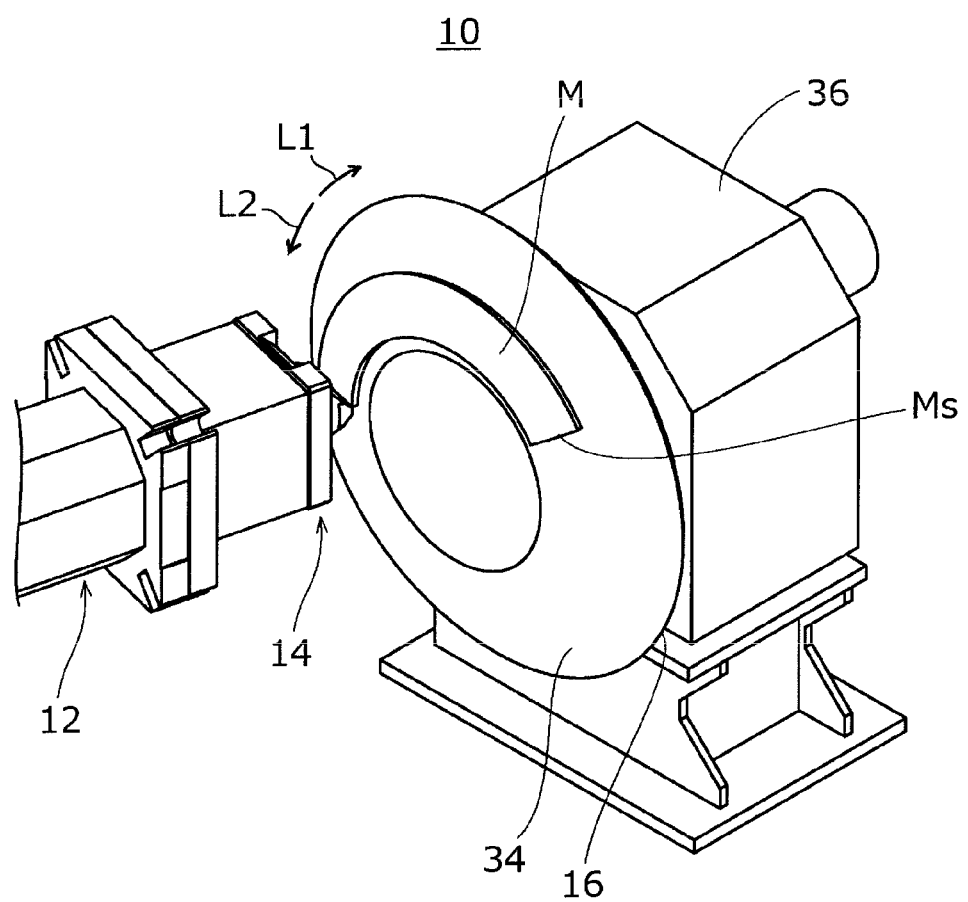
FIG. 1 illustrates a perspective view showing a state where a rubber member according to a first embodiment is manufactured.
Figure 2:
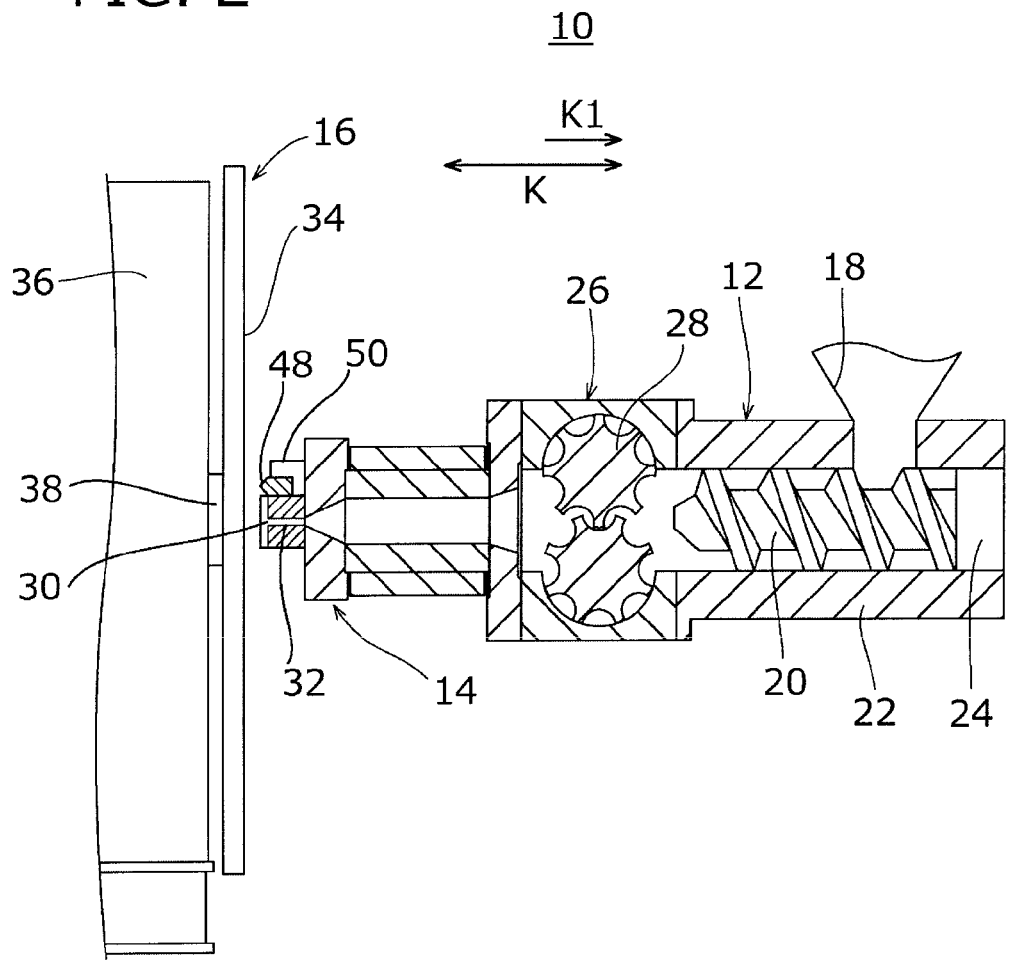
FIG. 2 illustrates a schematic cross-sectional view of an apparatus of manufacturing a rubber member according to the first embodiment.

As shown in FIG. 1 and FIG. 2, an apparatus 10 of manufacturing a rubber member according to this embodiment includes: an extruder 12; a mouthpiece 14; and a support member 16. The apparatus 10 extrudes a mixed and kneaded rubber material from a mouthpiece 14 by the extruder 12 and molds a rubber member M having a circular annular plate shape exemplified in FIG. 5 on a support surface 34 of the support member 16.

The extruder 12 includes: a hopper 18 into which a rubber material is charged; a screw 20 which feeds the rubber material frontward while applying heat to the rubber material; a cylindrical barrel 22 which incorporates the screw 20 therein; and a drive device 24 which drives the screw 20. The extruder 12 kneads the rubber material until the rubber material has low viscosity, and feeds the rubber material to the mouthpiece 14. In this embodiment, a gear pump 26 is disposed between the extruder 12 and the mouthpiece 14. The gear pump 26 has a pair of gears 28 in the inside thereof, and feeds the rubber material extruded from the extruder 12 toward the mouthpiece 14 while controlling a feed amount of the rubber material.

The mouthpiece 14 includes: an ejection port 30 for ejecting a rubber material; and a flow passage 32 through which the rubber material supplied from the extruder 12 through the gear pump 26 is introduced into the ejection port 30. A distal end portion of the mouthpiece 14 is arranged so as to face the support surface 34 formed on the support member 16 in an opposed manner.

The extruder 12 on which the mouthpiece 14 is mounted is moved by a moving mechanism not shown in the drawings such that the mouthpiece 14 moves toward or away from the support surface 34 of the support member 16. Although the extruder 12 is made to move relative to the support member 16 in this embodiment, the support surface 34 and the mouthpiece 14 may be made to relatively move toward or away from each other by moving the support member 16 relative to the mouthpiece 14.

The support member 16 has a circular disc shape, and one plate surface thereof forms the support surface 34 which faces the mouthpiece 14. The support member 16 is connected to a rotary shaft 38 of a rotary drive device 36. By rotating the support member 16 about the rotary shaft 38 by driving the rotary drive device 36, the support surface 34 and the mouthpiece 14 move relative to each other. In the drawing, symbol L1 indicates a front side in a moving direction of the support surface 34 relative to the mouthpiece 14, and symbol L2 indicates a rear side in a moving direction of the support surface 34 relative to the mouthpiece 14.

Figure 3:
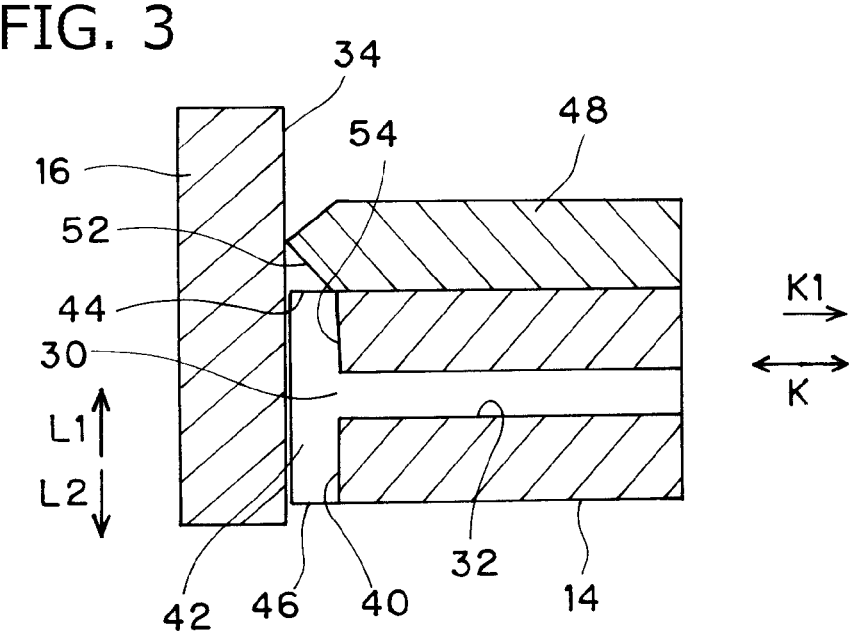
FIG. 3 illustrates a cross-sectional view showing a mouthpiece and an area in the vicinity of the mouthpiece according to the first embodiment.

As shown in FIG. 3 in an enlarged manner, a recessed portion 40 which is indented in a direction K1 away from the support surface 34 is formed on a distal end portion of the mouthpiece 14 which faces the support surface 34 in an opposed manner. When the mouthpiece 14 is moved close to the support surface 34, a rubber pool portion 42 which is a space in which a rubber material is pooled is defined between the recessed portion 40 and the support surface 34.

The ejection port 30 formed in the mouthpiece 14 is formed at a position facing the support surface 34 in an opposed manner and opens in the rubber pool portion 42, and ejects a rubber material toward the support surface 34 from the ejection port 30. In this embodiment, a rubber material which is ejected into the rubber pool portion 42 from the ejection port 30 is made to impinge on the support surface 34 so that the rubber material is adhered to the support surface 34 and, at the same time, the rubber material is filled into the inside of the rubber pool portion 42.

In the rubber pool portion 42, an opening portion 44 which opens toward a front L1 side in the moving direction of the support surface 34 relative to the mouthpiece 14 is formed, and an opening portion 46 which opens toward a rear L2 side in the moving direction of the support surface 34 relative to the mouthpiece 14 is also formed. A shape of the opening portion 44 formed on a front L1 side in the moving direction of the support surface 34 conforms to a cross-sectional shape of a rubber member M to be molded.

The opening portion 44 formed on a front L1 side in the moving direction of the support surface 34 is formed so as to be opened and closed by a shutter 48. The shutter 48 is mounted on the mouthpiece 14 such that the shutter 48 is movable in a normal direction K of the support surface 34 (a direction that the shutter 48 moves toward or away from the support surface 34). By operating a shutter drive device 50, the shutter 48 moves between a closing position shown in FIG. 3 where the shutter 48 closes the opening portion 44 of the rubber pool portion 42 and an open position shown in FIG. 4C where the shutter 48 opens the opening portion 44 of the rubber pool portion 42.

A closing surface 52 capable of closing the above-mentioned opening portion 44 is formed on the shutter 48. The closing surface 52 is a surface capable of closing the rubber pool portion 42 on the above-mentioned front L1 side in the moving direction of the support surface 34. The closing surface 52 is formed of an inclined surface which is inclined so as to narrow a distance between the closing surface 52 and the support surface 34 toward the front L1 side in the moving direction of the support surface 34. That is, the closing surface 52 is inclined such that the further the closing surface 52 extends toward the front L1 side in the moving direction of the support surface 34, the closer the closing surface 52 approaches the support surface 34. In this embodiment, a distal end surface of the mouthpiece 14, that is, an opposedly facing surface 54 which faces the support surface 34 and forms the rubber pool portion 42 between the opposedly facing surface 54 and the support surface 34 is formed of a flat surface shape parallel to the support surface 34.

Figure 5:
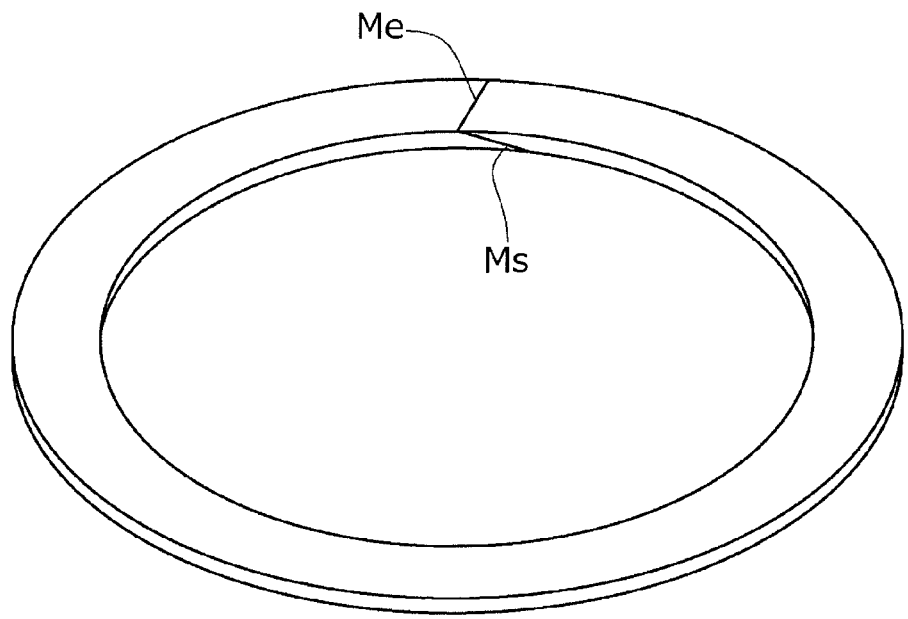
FIG. 5 illustrates a perspective view of the rubber member according to the first embodiment.

Next, a method of manufacturing the rubber member M having a circular annular plate shape exemplified in FIG. 5 using the manufacturing device 10 is described.

Firstly, the extruder 12 is moved by driving the moving mechanism not shown in the drawing so that the mouthpiece 14 is moved close to the support surface 34 so as to form the rubber pool portion 42 while leaving a clearance which allows the rotation of the support member 16 between a distal end portion of the mouthpiece 14 connected to the extruder 12 and the support surface 34 of the support member 16. Then, the shutter 48 is arranged at the closing position so as to close the opening portion 44 of the rubber pool portion 42 by the closing surface 52 of the shutter 48 (see FIG. 3).

Figure 4A:
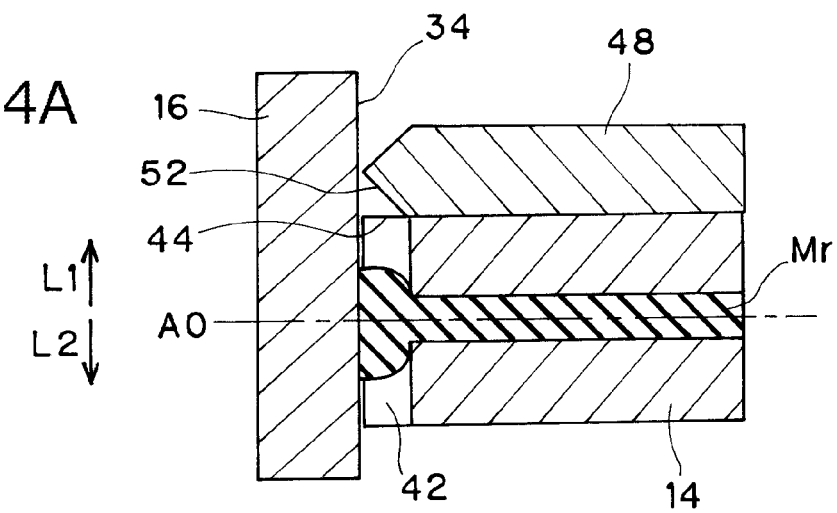
FIG. 4A to FIG. 4C illustrate cross-sectional views showing steps of manufacturing the rubber member according to the first embodiment.

In a state where the opening portion 44 is closed by the closing surface 52 and the support surface 34 and the mouthpiece 14 are stopped as described above, the extruder 12 and the gear pump 14 are driven so that a fixed feeding amount of rubber material is ejected into the inside of the rubber pool portion 42 from the ejection port 30. Accordingly, as shown in FIG. 4A, a rubber material Mr is filled in the rubber pool portion 42 while being impinged on the support surface 34 and being adhered to the support surface 34.

After at least a portion of the rubber pool portion 42 is filled with the rubber material Mr, while continuing the ejection of the rubber material Mr from the ejection port 30, the rotation of the support surface 34 is started so as to rotatably move the support surface 34 and the mouthpiece 14 relative to each other. To be more specific, in this embodiment, in a stage where a half or more of the rubber pool portion 42 is filled with the rubber material Mr and the rubber material Mr does not reach the whole of the closing surface 52 of the shutter 48, the rotary drive device 36 is driven so as to rotate the support member 16 about the rotary shaft 38 thus rotating the support surface 34 relative to the mouthpiece 14 in a predetermined direction at a predetermined rotational speed.

Figure 4B:
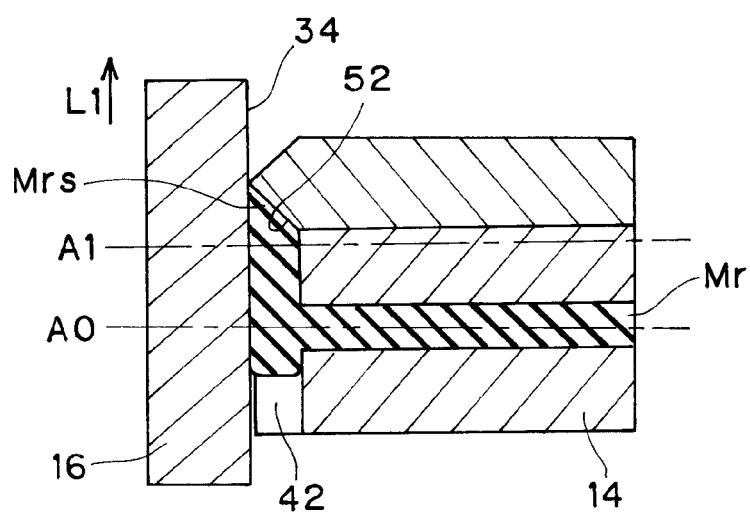
Figure 4C:
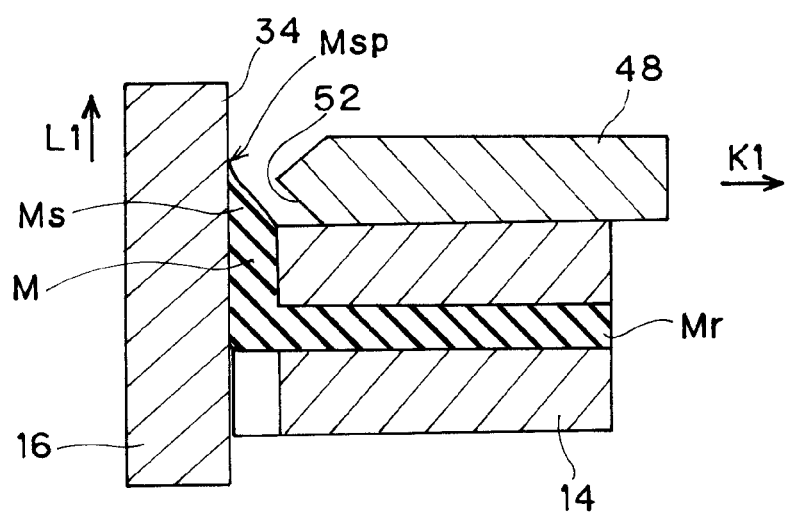

Next, a lamination starting end Mrs of the rubber material Mr to the support surface 34 is pressed to the closing surface 52 thus molding the lamination starting end Mrs into an inclined surface shape as shown in FIG. 4B and, thereafter, as shown in FIG. 4C, the shutter 48 is moved so as to move the closing surface 52 in the direction K1 away from the support surface 34. To be more specific, in a stage where the support surface 34 is moved to the predetermined position A1 from the initial position A0, the shutter drive device 50 is driven so as to move the shutter 48 from the closing position to the open position thus opening the opening portion 44 of the rubber pool portion 42. Here, "predetermined position A1" is a rotary position of the support surface 34 where a rubber material Mr filled in the rubber pool portion 42 reaches at least the whole of the closing surface 52, and "predetermined position A1" can be set in advance based on an ejection amount of the rubber material Mr, a rotational speed of the support surface 34 and the like.

Thereafter, the support surface 34 is continuously rotated in a state where the opening portion 44 is opened, and the support surface 34 is rotated until a distal end portion of the mouthpiece 14 reaches a position which is obtained by the further rotation of the distal end portion of the mouthpiece 14 by a predetermined angle from the position at which the distal end portion of the mouthpiece 14 starts the rotation thereof on the support surface 34 (starting end position Msp of the rubber member M molded on the support surface 34) thus laminating a terminal end portion Me of the rubber member M to the starting end portion Ms. In this case, the lamination is performed such that, after the distal end portion of the mouthpiece 14 reaches the starting end position Msp, an amount of rubber material Mr ejected from the ejection port 30 is gradually reduced so that the terminal end portion Me is molded such that a thickness is gradually reduced and, at the same time, the terminal end portion Me is laminated to the starting end portion Ms such that the terminal end portion Me rubs into the starting end portion Ms by the opening portion 44 of the rubber pool portion 42. Accordingly, the circular annular rubber member M having a cross-sectional shape corresponding to a shape of the opening portion 44 is molded on the support surface 34, and the starting end portion Ms and the terminal end portion Me are joined to each other at the joining portion of the rubber member M in a state where inclined surfaces of the starting end portion Ms and the terminal end portion Me overlap with each other (see FIG. 5).

Then, when the distal end portion of the mouthpiece 14 goes beyond the above-mentioned starting end position Msp and reaches the position rotated from the starting end position Msp by a predetermined angle, the rotation of the support surface 34 is stopped and, at the same time, the extruder 12 is stopped so as to stop the ejection of the rubber material Mr. Thereafter, the moving mechanism not shown in the drawing is driven so as to move the extruder 12 such that the mouthpiece 14 is moved away from the support surface 34.

As described above, in this embodiment, on the shutter 48 which opens and closes the opening portion 44 of the rubber pool portion 42, the closing surface 52 which closes the opening portion 44 is formed in an inclined manner so as to narrow a distance between the closing surface 52 and the support surface 34 toward a front L1 side in a moving direction of the support surface 34. Then, the lamination starting end Mrs of the rubber material Mr filled in the rubber pool portion 42 is molded into an inclined surface shape by pressing the lamination starting end Mrs to the closing surface 52 by the relative movement between the support surface 34 and the mouthpiece 14, and thereafter, the closing surface 52 is retracted so as to open the opening portion 44 thus enabling the extrusion of the rubber member M having a cross-sectional shape corresponding to the opening portion 44. Accordingly, as shown in FIG. 4C, the starting end portion Ms of the rubber member M can be molded into an inclined surface shape and hence, when the starting end portion Ms of the rubber member M is joined to the terminal end portion Me, a thickness of the joining portion does not have a large thickness compared to other portions as shown in FIG. 5 and hence, a weight balance can be made uniform.

Second Embodiment

Figure 6:
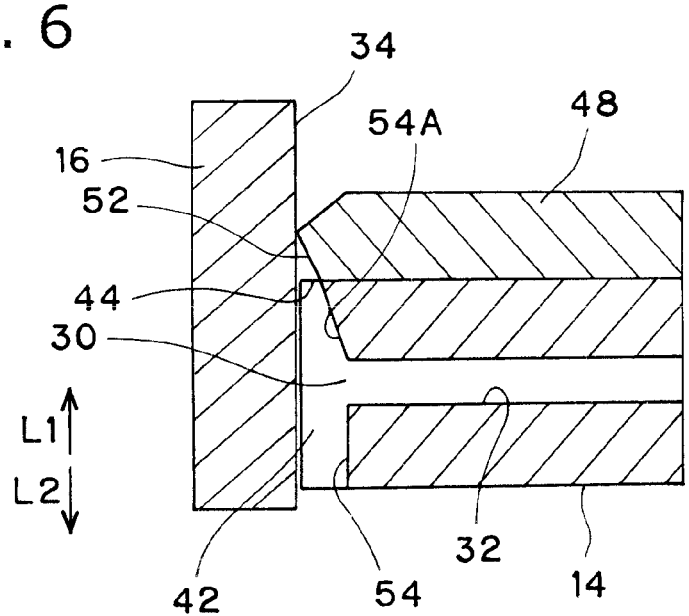
FIG. 6 illustrates a cross-sectional view showing a mouthpiece and an area in the vicinity of the mouthpiece according to a second embodiment.

FIG. 6 is a cross-sectional view showing the constitution of a mouthpiece and an area in the vicinity of the mouthpiece of a manufacturing apparatus according to the second embodiment. This embodiment differs from the first embodiment with respect to a shape of an opposedly facing surface 54 of a mouthpiece 14 which faces a support surface 34 in an opposed manner. On a rear L2 side in a moving direction from an ejection port 30, in the same manner as the first embodiment, the opposedly facing surface 54 is formed into a flat surface shape parallel to the support surface 34. However, on a front L1 side in the moving direction from the ejection port 30, the opposedly facing surface 54 is formed into an inclined surface 54A which is inclined so as to narrow a distance between the inclined surface 54A and the support surface 34 toward the front L1 side in the moving direction. A closing surface 52 of a shutter 48 is formed into an inclined surface contiguously formed with the inclined surface 54A of the opposedly facing surface 54. In this manner, the opposedly facing surface 54 of the mouthpiece 14 may be formed into the inclined surface 54A on the front L1 side in the moving direction, and a rubber material Mr can be smoothly fed to the closing surface 52 of the shutter 48 by making use of the inclined surface 54A. In the second embodiment, other constitutions and the manner of operation and advantageous effects are substantially equal to those of the first embodiment and hence, the explanation of other constitutions and the manner of operation and advantageous effects is omitted.

Third Embodiment

Next, the third embodiment is described with reference to FIG. 7 to FIG. 9. The third embodiment mainly differs from the above-mentioned first embodiment with respect to a point that a support member is formed into a drum shape, and a ribbon-shaped rubber member ejected from a mouthpiece is wound around an outer peripheral surface of a support member, and a point that a mouthpiece is not provided with a shutter.

That is, a manufacturing apparatus 10A according to the third embodiment is an apparatus where a rubber material Mr kneaded by an extruder 12 is extruded from a mouthpiece 14, the ribbon-shaped rubber member M is wound around a support surface 62 which is an outer peripheral surface of the support member 60, and the rubber member M is molded in a laminated state. To be more specific, the ribbon-shaped rubber member is wound around the drum which is a support member in a spiral manner by rotating the drum while moving the drum in an axial direction thus manufacturing the rubber member having a circular cylindrical shape as a whole.

The support member 60 is formed of the rotatable cylindrical drum 64, and an outer peripheral surface of the drum 64 forms the support surface 62 which faces the mouthpiece 14 in an opposed manner. The support member 60 is configured to be rotatable about an axis thereof by a drive device not shown in the drawing. By rotating the support member 60, the support surface 62 and the mouthpiece 14 are rotatably moved relative to each other.

Figure 9A:
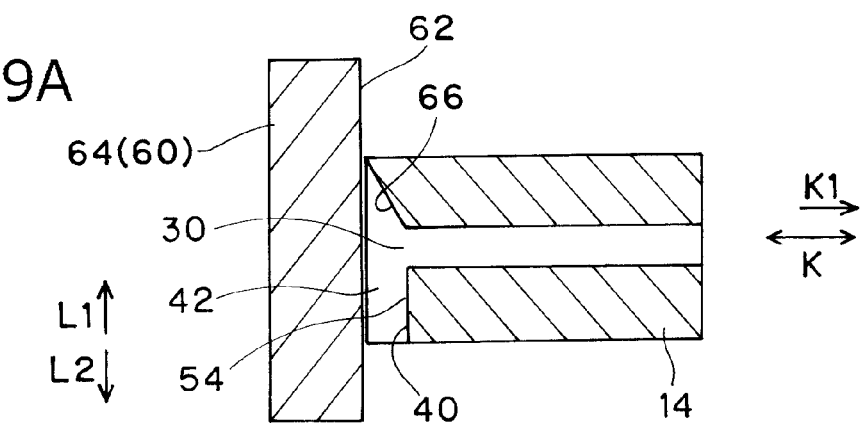
FIG. 9A to FIG. 9D illustrate cross-sectional views of a mouthpiece and an area in the vicinity of the mouthpiece showing steps of manufacturing the rubber member according to the third embodiment.

As shown in FIG. 9A, also in the third embodiment, a recessed portion 40 is formed on a distal end portion of the mouthpiece 14, and a rubber pool portion 42 is defined between the recessed portion 40 and the support surface 62 when the mouthpiece 14 is moved close to the support surface 62. Further, an ejection port 30 which opens in the rubber pool portion 42 is formed on an opposedly facing surface 54 of the mouthpiece 14 which faces the support surface 62 in an opposed manner, and a rubber material is ejected to the support surface 62.

In the third embodiment, a closing surface 66 capable of closing the rubber pool portion 42 on a front L1 side in a moving direction of the support surface 62 is formed on the opposedly facing surface 54. To be more specific, the opposedly facing surface 54 is formed into a flat surface shape perpendicular to a normal direction K of the support surface 62 on a rear L2 side in the moving direction of the support surface 62 from an ejection port 30, and the opposedly facing surface 54 is formed into the closing surface 66 having an inclined surface shape which is inclined so as to narrow a distance between the closing surface 66 and the support surface 62 toward the front L1 side in the moving direction on the front L1 side in the moving direction of the support surface 62 from the ejection port 30.

Figure 8:
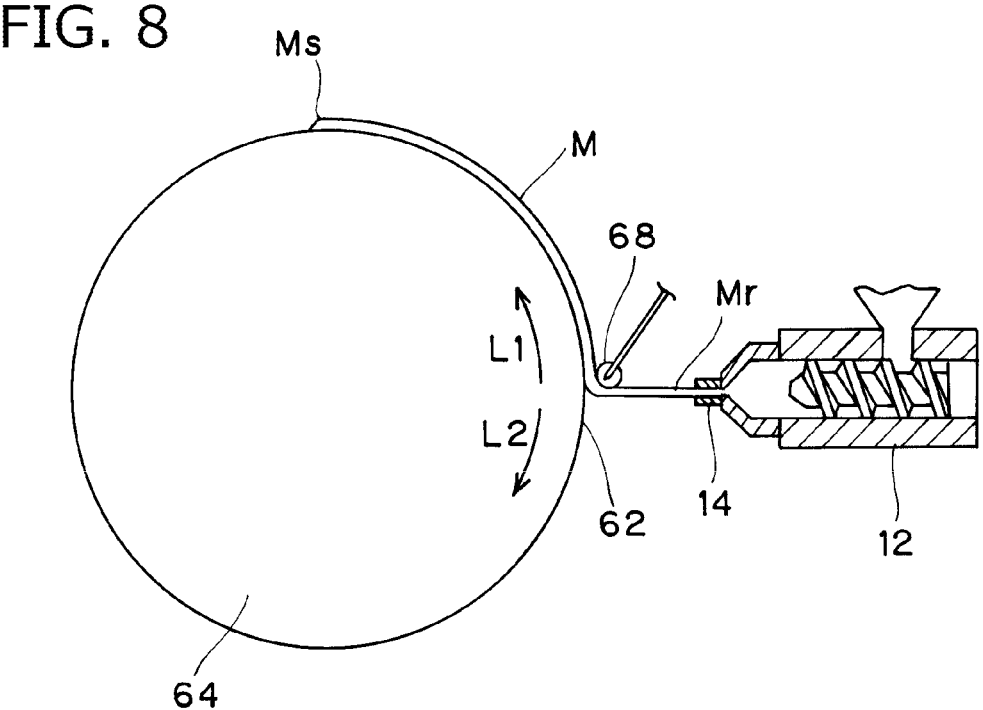
FIG. 8 illustrates a cross-sectional view showing a state where a rubber member according to the third embodiment is manufactured.

In FIG. 8, symbol 68 indicates a guide roll for winding and laminating the ribbon-shaped rubber member M ejected from the mouthpiece 14 on the support surface 62. The guide roll 68 is configured to be moved between an operation position in the vicinity of the support surface 62 shown in FIG. 8 and a retracting position away from the support surface 62 by a drive device not shown in the drawing.

Figure 7:
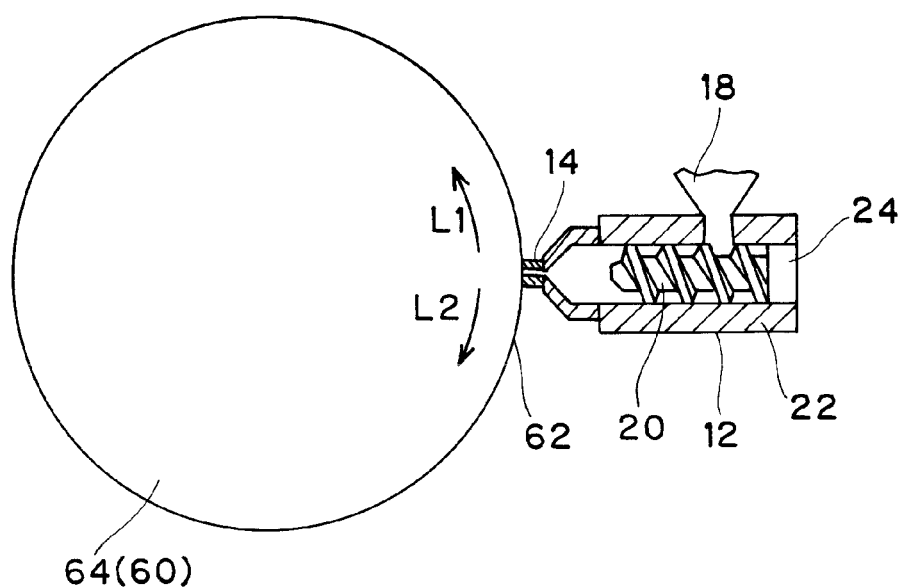
FIG. 7 illustrates a schematic cross-sectional view of an apparatus of manufacturing a rubber member according to a third embodiment.

In manufacturing a rubber member using the manufacturing apparatus 10A, firstly, as shown in FIG. 7, the extruder 12 is moved by driving the moving mechanism not shown in the drawing so that the mouthpiece 14 is moved close to the support surface 62 so as to form the rubber pool portion 42 while leaving a clearance between a distal end portion of the mouthpiece 14 connected to the extruder 12 and the support surface 62 of the drum 64 which allows the rotation of the drum 64. With such an operation, as shown in FIG. 9A, the rubber pool portion 42 is brought into a state where a front L1 side of the rubber pool portion 42 in the moving direction is closed by the closing surface 66 formed on the mouthpiece 14.

Figure 9B:
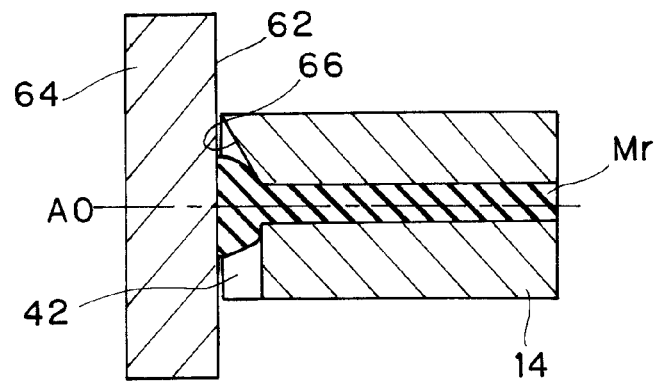

In a state where the rubber pool portion 42 is closed by the closing surface 66 and the support surface 62 and the mouthpiece 14 are stopped as described above, the extruder 12 is driven so that a fixed feeding amount of rubber material is ejected into the inside of the rubber pool portion 42 from the ejection port 30. Accordingly, as shown in FIG. 9B, a rubber material Mr is filled in the rubber pool portion 42 while being impinged on the support surface 62 and being adhered to the support surface 62.

After at least a portion of the rubber pool portion 42 is filled with the rubber material Mr, while continuing the ejection of the rubber material Mr from the ejection port 30, the rotation of the drum 64 is started. In this embodiment, in a stage where a half or more of the rubber pool portion 42 is filled with the rubber material Mr and the rubber material Mr does not yet reach the whole of the closing surface 66, the drum 64 is rotated thus rotating the support surface 62 relative to the mouthpiece 14 in a predetermined direction at a predetermined rotational speed.

Figure 9C:
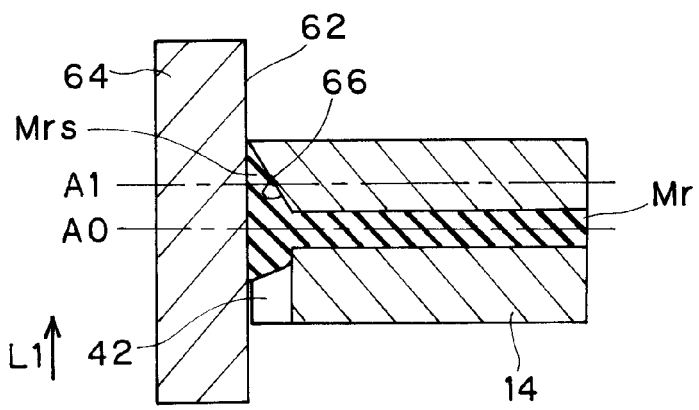
Figure 9D:
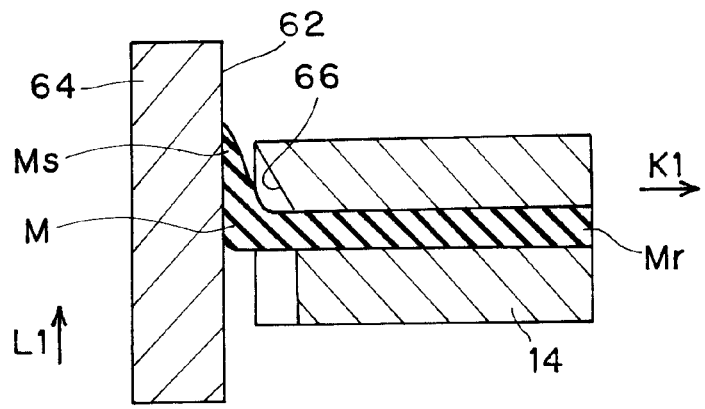
Figure 10:
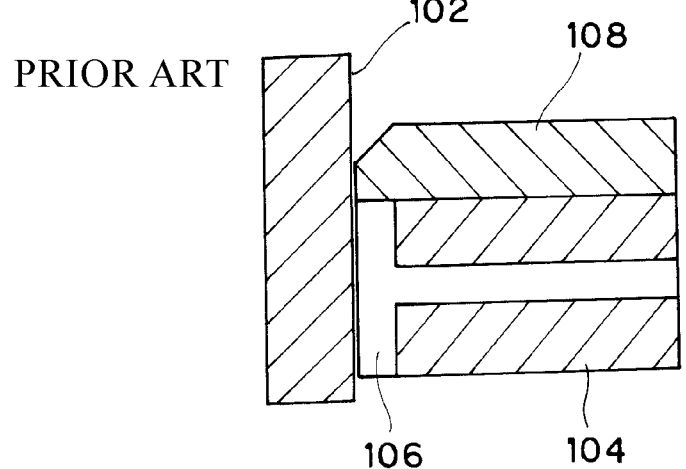
FIG. 10 illustrates a cross-sectional view of a mouthpiece and an area in the vicinity of the mouthpiece in a conventional manufacturing apparatus.
Figure 11:
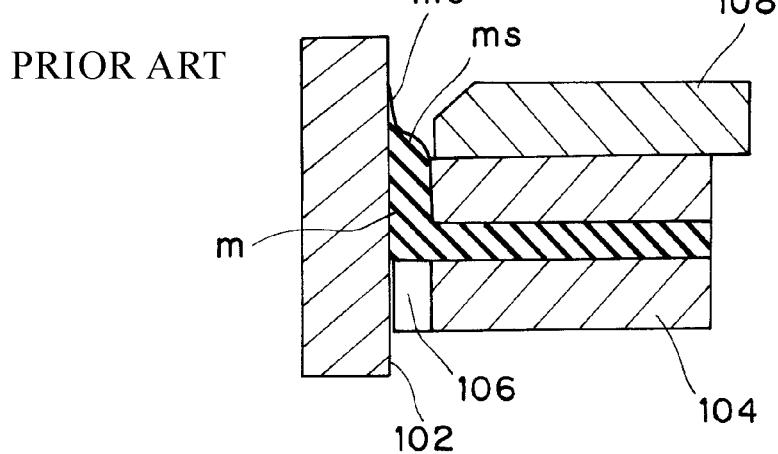
FIG. 11 illustrates a cross-sectional view of a mouthpiece and an area in the vicinity of the mouthpiece in a manufacturing stage according to a comparative example.

Next, a lamination starting end Mrs of the rubber material Mr to the support surface 62 is pressed to the closing surface 66 thus molding the lamination starting end Mrs into an inclined surface shape as shown in FIG. 9C and, thereafter, as shown in FIG. 9D, the mouthpiece 14 is moved in the direction K1 away from the support surface 62 thus moving the closing surface 66 in the direction K1 away from the support surface 62. To be more specific, at a stage where the support surface 62 is moved to the predetermined position A1 from the initial position A0, the extruder 12 provided with the mouthpiece 14 is moved so as to be away from the drum 64. Here, "predetermined position A1" is a rotary position of the support surface 62 where a rubber material Mr filled in the rubber pool portion 42 reaches at least the whole of the closing surface 66, and "predetermined position A1" can be set in advance based on an ejection amount of the rubber material Mr, a rotational speed of the support surface 62 and the like.

Thereafter, as shown in FIG. 8, the guide roll 68 is moved to the above-mentioned operation position, and the rotation of the drum 64 is continued while guiding the rubber material Mr ejected from the mouthpiece 14 on the support surface 62 of the drum 64 by the guide roll 68 thus winding the ribbon-shaped rubber member M on the support surface 62 in a spiral manner whereby the ribbon-shaped rubber member M is molded in a laminated state. Then, as a final step, the positions in the rotational direction of the drum 64 and the positions in the axial direction of the drum 64 are set such that the terminal end portion of the rubber member M reaches the position where the starting end portion Ms of the ribbon-shaped rubber member M exists, and the extrusion molding is finished. At the time of finishing extrusion molding, corresponding to the starting end portion Ms molded in an inclined surface shape gradually increasing with thickness, an amount of rubber material ejected from the ejection port 30 is gradually reduced thus molding the terminal end portion into a shape gradually reducing with thickness.

As has been described heretofore, according to this embodiment, the closing surface 66 which closes a front L1 side in a moving direction of the rubber pool portion 42 is formed on the mouthpiece 14, the lamination starting end Mrs of the rubber material Mr filled in the rubber pool portion 42 is pressed to the closing surface 66 thus molding the lamination starting end Mrs into an inclined surface shape, and the mouthpiece 14 is retracted so as to enable the extrusion performed thereafter. Accordingly, the starting end portion Ms of the rubber member M can be molded into an inclined surface shape as shown in FIG. 9D and hence, a weight balance can be made uniform. In the third embodiment, other constitutions and the manner of operation and advantageous effects are substantially equal to those of the first embodiment and hence, the description of other constitutions and the manner of operation and advantageous effects is omitted.

Other Embodiments

In the above-mentioned embodiment, the description has been made with respect to the case where the rubber member having a circular annular plate shape is molded and the case where the ribbon-shaped rubber member is laminated so that the cylindrical rubber member is molded as a whole, but the invention is not limited to those embodiments. For example, the invention can be applied in various modes such as a case where a cylindrical rubber member is molded by joining by lamination a starting end portion and a terminal end portion of a molded plate-shaped rubber member in a thickness direction. As specific applications, the invention can be used in molding respective tire constitutional members such as an inner liner, side wall portions, bead portions and a tread portion of a pneumatic tire.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for manufacturing a rubber member, comprising: an extruder which kneads a rubber material and extrudes a kneaded rubber material; a mouthpiece which ejects the rubber material supplied from the extruder; and a support surface which faces the mouthpiece in an opposed manner, the support surface and the mouthpiece being moved relative to each other thus molding a rubber member made of the rubber material on the support surface, wherein the apparatus further comprises:
   a rubber pool portion which is formed between the mouthpiece and the support surface and in which the rubber material ejected from an ejection port of the mouthpiece is pooled; and
   a closing surface which is capable of closing the rubber pool portion on a front side in a moving direction of the support surface with respect to the mouthpiece, the closing surface being inclined so as to narrow a distance between the closing surface and the support surface toward the front side in the moving direction, and wherein
   the rubber material is ejected from the ejection port in a state where the rubber pool portion is closed by the closing surface, the support surface and the mouthpiece are moved relative to each other after at least a portion of the rubber pool portion is filled with the rubber material, and a lamination starting end of the rubber material to the support surface is pressed to the closing surface thus molding the lamination starting end into an inclined surface shape and, thereafter, the closing surface is moved in a direction away from the support surface.

2. The apparatus according to claim 1, wherein the rubber pool portion has an opening portion on the front side in the moving direction, a shutter which opens and closes the opening portion is mounted on the mouthpiece, the closing surface capable of closing the opening portion is formed on the shutter, and the closing surface is moved in a direction away from the support surface by moving the shutter.

3. The apparatus according to claim 2, wherein the support surface is formed of a plate surface of a support member having a disc shape, and a rubber member having a circular annular plate shape is molded on the support surface due to the relative rotational movement between the support surface and the mouthpiece.

4. The apparatus according to claim 1, wherein the support surface is formed of an outer peripheral surface of a rotatable drum, the mouthpiece has an opposedly facing surface which is disposed so as to face the support surface in an opposed manner and forms the rubber pool portion between the opposedly facing surface and the support surface, the closing surface is formed on the opposedly facing surface, and the closing surface is moved in a direction away from the support surface by moving the mouthpiece in a direction away from the support surface.

* * * * *